Nov. 13, 1962  W. J. KATZ  3,063,939
APPARATUS FOR AND IMPROVED METHOD OF THICKENING
Original Filed Aug. 3, 1959  3 Sheets-Sheet 1

INVENTOR.
WILLIAM J. KATZ
BY
Ernst W. Schultz
ATTORNEY

United States Patent Office 3,063,939
Patented Nov. 13, 1962

3,063,939
APPARATUS FOR AND IMPROVED METHOD OF THICKENING
William J. Katz, Fox Point, Wis., assignor to Chain Belt Company, Milwaukee, Wis., a corporation of Wisconsin
Continuation of application Ser. No. 831,126, Aug. 3, 1959. This application Mar. 8, 1962, Ser. No. 180,924
2 Claims. (Cl. 210—44)

This invention relates to apparatus for and the method of thickening or dewatering suspensions by air flotation and particularly to the concentration of the suspended material by its selective removal from the blanket of floating material developed in the tank by air flotation.

This application is a continuation of my application Serial No. 831,126 filed August 3, 1959 for Apparatus for and Improved Method of Thickening, now abandoned in favor of this application.

For the selective removal of the blanket, a rotating drum is supported above the tank and moved over the quiescent zone of the tank to contact only whatever portions are supported above a given height above the normal liquid level of the tank. As the drum rotates, the portion adhering thereto is removed by a scraper and falls into a trough having a downward pitch whereby the collected material is conveyed away from the tank.

The invention is based on the fact that in the continuous process of air-flotation, the concentration of the suspended material varies greatly not only according to its height or depth but also at different times and in different areas over the surface of the blanket, and the invention is based upon the discovery that in certain cases of air flotation of suspended solids and other material, a corresponding relationship may exist or may be developed between the density and the viscosity of the floating air-solids blanket whereby such portions of the air-solids blanket having a high viscosity and a corresponding high solids content will be withdrawn at maximum rates while those portions of the air-solids blanket having a relatively low viscosity and solids concentration will be withdrawn from the tank at a much lesser rate. Accordingly, the average concentration of the solids withdrawn from the tank will be substantially greater than the average concentration of the solids developed in the solids blanket in the tank thus providing a significant increase in the efficiency of the flotation-thickening unit.

The tank includes an upper quiescent zone and a lower separation zone into which the raw flow is introduced with a larger quantity of clear water provided with the air for flotation. The air is first dissolved in the clear water under pressure and in suddenly releasing such pressure, some of the air is caused to come out of solution in the form of finely divided bubbles. The water and the air bubbles are introduced into the tank with the raw flow. As the flow moves through the lower separation zone of the tank, the solids are lifted out of the flow by the air bubbles adhering thereto. The floating solids and air develop a sludge blanket at the water surface of the quiescent zone supporting a top layer of sludge above the water surface having a given minimum solids concentration. Because of the large amount of air required in the blanket as will be described, the concentration referred to occurs only in the upper fraction of the blanket. The required air must, however, comprise air bubbles of a minimum, i.e. smallest possible, size which will remain intact in the sludge blanket and support the layer of sludge above the normal water level.

It is possible to add the clear water to the raw flow and dissolve the air therein while under pressure so that the air bubbles are formed as the mixture is passed through a pressure-reducing valve. However, the present invention is intended particularly for the dewatering of activated sewage sludges which are not readily passed through a reducing valve without breaking up the sludge particles. A further advantage in forming the air bubbles only in the clear water resides in the fact that only the clear water then circulates through the pump and reducing valve, and fouling and frequent cleaning of these parts and of the gas contact chamber is avoided.

The clear water may be variously supplied. The most convenient supply is generally from the effluent of the thickening unit itself, and is referred to as the "recycle water."

Although the following objects of the invention refer to sewage treatment, the invention is not to be considered as limited thereto.

A principal object of the invention is to provide apparatus for the efficient thickening or dewatering of suspended solids and the like including either or both primary or activated sewage sludge.

Another object is to provide apparatus with a low detention time for low cost and efficient operation.

Another object is to provide apparatus and a method for separating both settleable and floatable solids at considerably higher rates as in conjunction with a conventional sewage treatment plant.

Another object of the invention is to provide the thickening of untreated or activated sewage sludge or both at high rates providing the necessary solids concentration and an effluent which can be discharged with the plant effluent or returned to the primary settling tank which latter then becomes a part of the recycling procedure. This allows the rate of operation of the thickener to be considerably varied and to correspond with the large fluctuations which occur from hour to hour in flow through the plant.

Another object of the invention is to provide apparatus for the efficient thickening of the sludge at low cost and of flexible operation so that a single unit may be used in connection with a number of primary settling tanks operating in parallel at peak loads and separately thereof at normal and less than normal loads.

Another object is to provide apparatus with a lesser detention time providing the desired dewatering of the larger part of the sludge to be carried out with the separated water.

Another object is to provide apparatus for and a method of separating both settleable solids and floatable solids at extremely high rates in conjunction with a conventional sewage treatment plant so that the plant output may be greatly increased with only the relatively small capital investment required for such apparatus.

The drawings furnished herewith illustrate the best mode of carrying out the invention as presently contemplated and set forth hereinafter.

In the drawings:

FIGURE 1 is a vertical sectional view of a gravity-settling tank connected for operation with the thickening tank embodying the invention. The settling tank is of reduced size relative to the thickening tank embodying the invention. The carriage and drum or roll operating over the thickening tank is shown at the influent of the tank and its position at the effluent end of the tank is shown in dotted lines;

Figure 1:
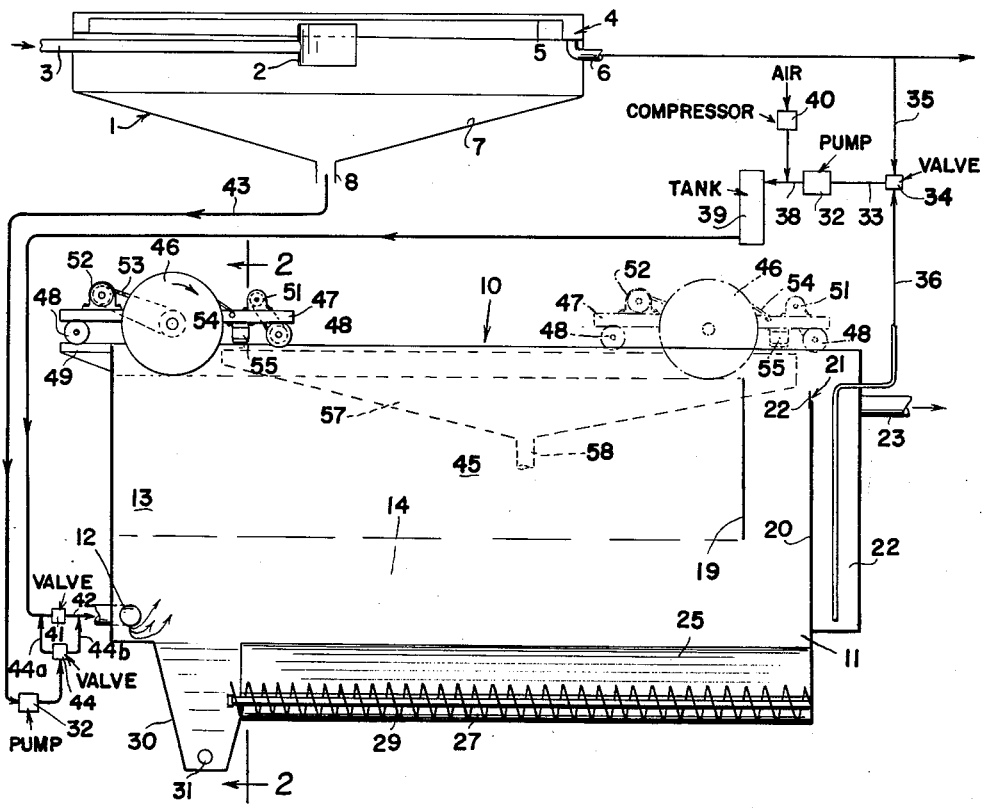
Figures 2, 3:
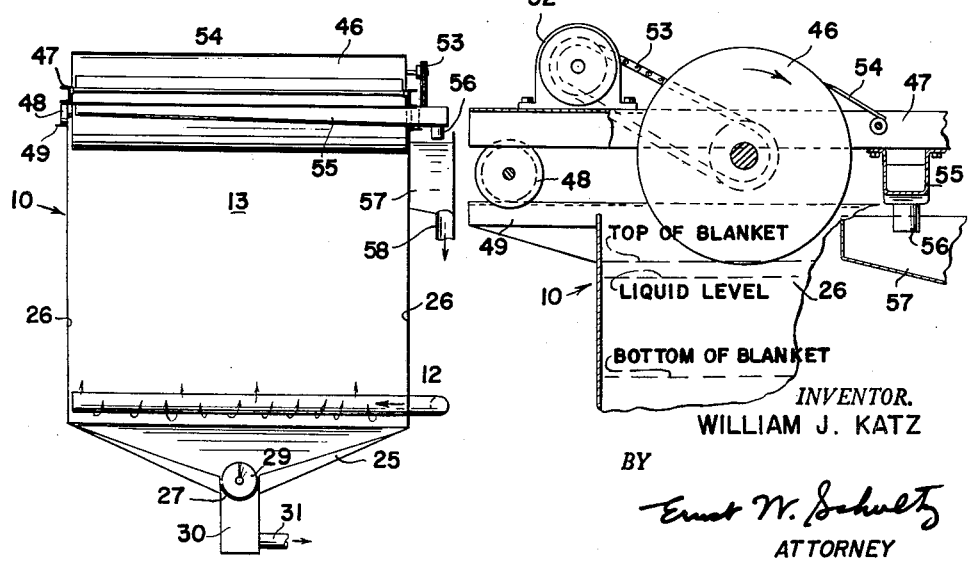
FIG. 2 is a vertical sectional view taken on line 2—2 of FIGURE 1 showing the drum in elevation and the inlet means for the raw flow and recycle water.
FIG. 3 is an enlarged end view of the drum to show the scraper blade and trough to receive the thickened sludge removed from the tank by the drum.
Figure 4:
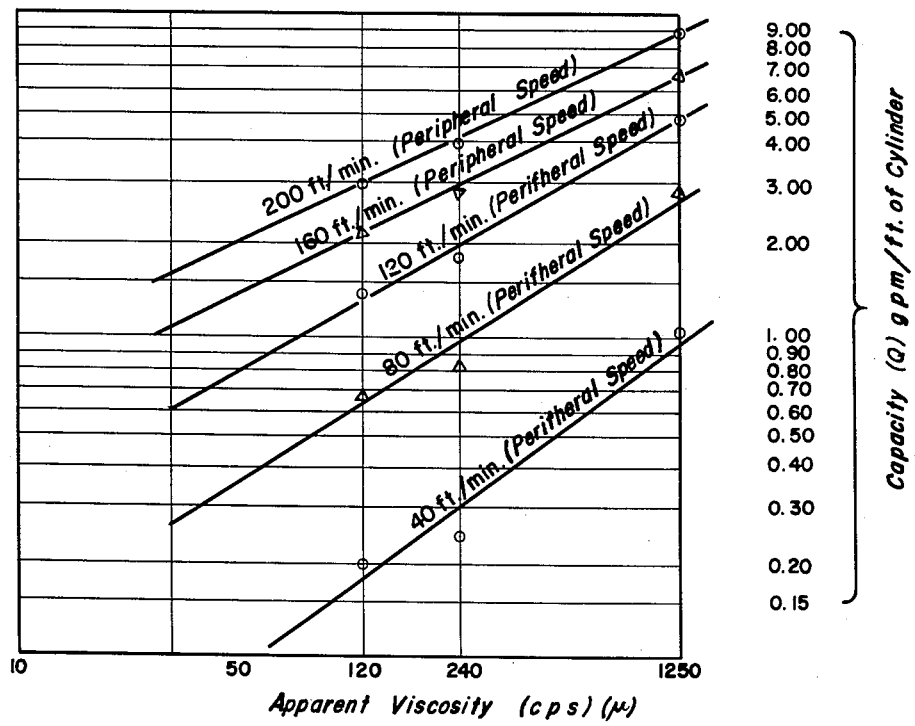
Figure 5:
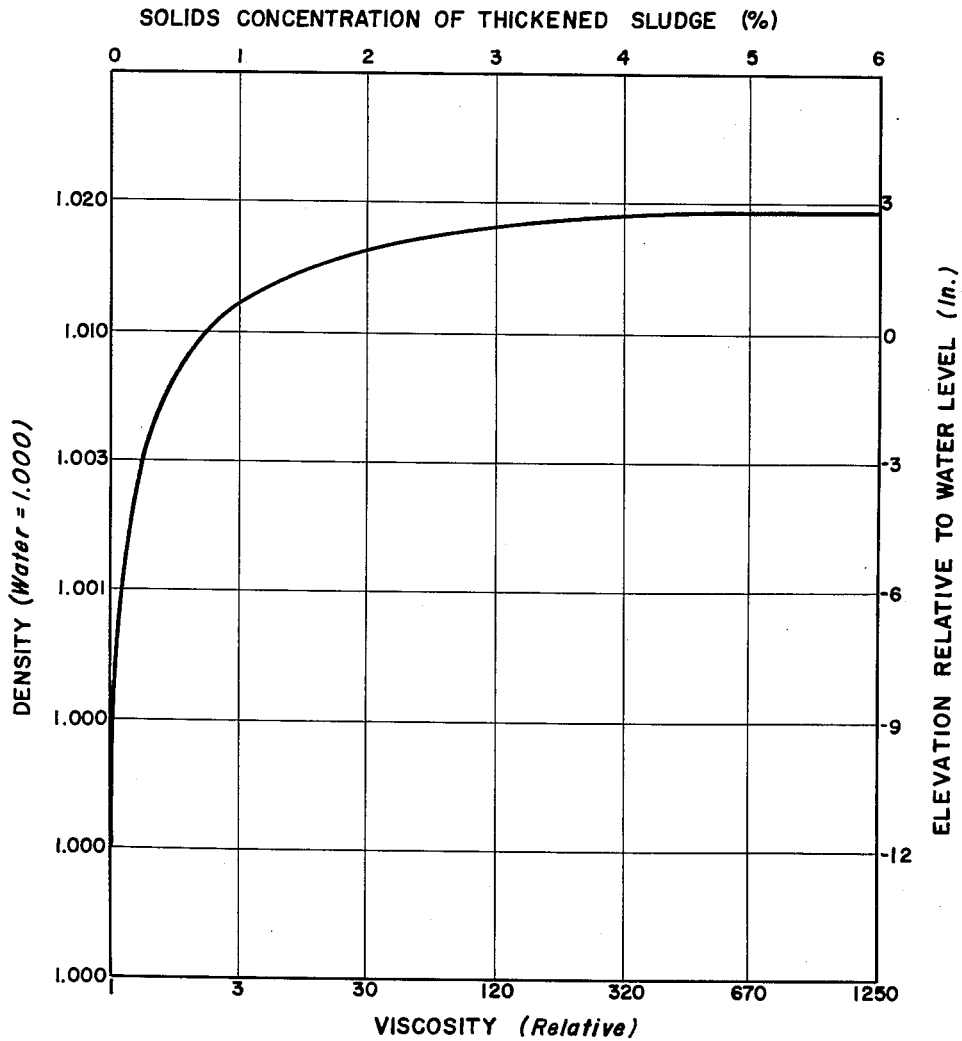

FIG. 4 is a graph showing the variation in the withdrawal of the thickened sludge according to its viscosity and at different peripheral speeds of the drum; and FIG. 5 is a graph having a single curve showing the approximate relationships between solids concentration of the thickened sludge and its viscosity and the elevation of the top of the sludge blanket above the water level with respect to its density.

The gravity settling tank 1 shown in the drawings includes the central well 2 for receiving the raw flow from the delivery pipe 3 connected thereto. The effluent launder 4 having an overflow weir 5 extending around the periphery of tank 1 is connected to the discharge pipe 6 which provides for withdrawal of clarified water and delivery to a discharge point or elsewhere for secondary treatment. Tank 1 may include suitable means, not shown, for moving the sludge which settles by gravity on the bottom 7 of the tank to the central outlet 8 of the tank. The thickening unit 10 includes the tank 11 and is fitted with the influent header 12 extending across the bottom of the tank adjacent to the influent end 13 thereof. The lower separation zone 14 extends along the floor of tank 11 to below the vertical baffle 19 spaced from the wall 20 forming the effluent end of the tank. The clear water from zone 14 flows upwardly between baffle 19 and wall 20 to the overflow weir 21 having an adjustable member 22 which determines the normal water level within the tank. The well 22 on the outside of wall 20 of the tank receives the water flowing over weir 21 and is provided with the pipe 23 for discharge or connection with delivery pipe 3 for recirculation of the water through tank 1. Generally, circulation through a final treatment tank would be sufficient where sewage sludges are being treated because the volume of water handled by unit 10 is a small fraction of that flowing through tank 1 or the final treatment tank referred to and would not affect the operation of either.

The bottom 25 of tank 11 slopes downwardly from the sides 26 to the trough 27 to form the grit collection zone 28 extending below and the length of separation zone 14. The conveyor screw 29 serves to move the material in tank 27 to the sump 30 located near the influent end of the tank. The invention is not intended for the separation of sand and grit as such, but the periodic removal of such material which cannot be prevented from reaching the unit allows operation of the unit to be continued for indefinite periods. Conveyor screw 29 requires only intermittent operation and the material may be allowed to collect in sump 30 and withdrawn periodically through pipe 31 connected to the sump 30.

The clear water diluent is supplied to the pump 32, shown diagrammatically, by line 33 connecting the pump and the valve 34. The pipe 35 connected to discharge pipe 6 of tank 1 and the pipe 36 extending into well 22 of tank 11 are connected to valve 34 which allows effluent to be taken either from tank 1 or tank 11 for delivery under pressure by pump 32 through the line 38 to the tank 39. The air compressor 40 shown diagrammatically is connected to line 38 to inject air under pressure into the water delivered to tank 39 under pressure. For maximum absorption of the air supplied by compressor 40, the tank 39 should include suitable means providing a large area of contact between the air and water. The pressure reducing valve 41 adjacent to tank 11 in the line 42 connecting header 12 and tank 39 allows the discharge of the water carrying the dissolved air so that the sudden reduction in pressure causes a part of the air to come out of solution in the form of minute, small bubbles of up to about 100 microns in diameter.

The delivery line 43 connects outlet 8 of tank 1 with the valve 44 which controls delivery of the sludge from tank 1 to either of lines 44a and 44b which are respectively connected to line 42 ahead of and behind valve 41. The sludge delivered to line 42 mixes with the water and air bubbles formed therein so that the air bubbles adhere to the sludge particles to form small buoyant structures. The header 12 of unit 10 is provided with a series of orifices, not shown, through which the diluted sludge and air bubbles are discharged into the lower separation zone 14 of the tank.

As the combined flow moves toward the effluent end of the tank, the buoyant structures comprising the solid particles and adsorbed air float upwardly out of the zone 14 and into the upper quiescent zone 45 of tank 1, extending from the influent end 13 of the tank to the baffle 19 at the effluent end of the tank. After an initial period of operation, a buoyant sludge blanket is developed in zone 45 at the water level of the tank as established by weir 21. This blanket, having a particularly large air-content in the required form as will be described, should extend one or more inches above the water level and from nine to twenty-four inches or more below the water level. The required form of the air refers to the size of the air bubbles and is in the order of 100 microns in diameter. Such size cannot be readily measured, but regulation of the size of the bubbles is readily effected in practice by regulating the gauge pressure at which the air is dissolved in the water and, assuming that a fair degree of saturation is achieved, a pressure of between 30 and 40 p.s.i.g. provides the size referred to. The following figures show the effect of pressure upon the formation of the bubbles.

| Tank Pressure, p.s.i.g. | Cu. Ft. of Air Dissolved per 100 gal. | Average Size of Air Bubbles Produced (Microns) | Cu. Ft. of Air Coming Out of Solution per 100 gals. |
|---|---|---|---|
| 10 | 0.2 | 40 | .13 |
| 20 | 0.8 | 60–80 | .27 |
| 30 | 1.1 | 80 | .42 |
| 40 | 1.6 | 100 | .58 |

In order to reduce the amount of free air which is delivered by the pump and which remains unused, tank 39 should provide as high a degree of saturation as possible. As shown above, when the flow is restored to atmospheric pressure upon passing through the pressure reducing valve, only a fraction of the dissolved air comes out of solution in bubbles to be available or usable for floating the solids to the surface of the water. Such air bubbles should be practically indiscernible and give the liquid a milky color upon leaving the pressure reducing valve. The use of greater pressure or of a valve which does not properly release the pressure, causes larger bubbles to be formed which do not have the proper characteristics and surface tension to be adsorbed by the solids particles without coalescing with adjoining bubbles. The larger bubbles formed either initially or by a number of smaller bubbles joined together, tend to break away and float upwardly toward the surface and escape as free air. In moving upwardly through the floating sludge blanket, all the smaller air bubbles in the path of the larger bubble are adsorbed. If this is widespread, the sludge blanket soon becomes exhausted of air and loses its buoyancy.

The buoyancy referred to is essential to the operation of the thickening process and has been previously proposed, but not successfully carried out as a continuous process. In practice, the present invention provides a sludge blanket generally having a depth of between six inches and sixteen inches and an average solids concentration throughout its depth of up to 3.5 percent. Thus its removal in a conventional manner as by scraping or conveyong by means of a series of flights operating through the blanket may provide a sludge having a concentration not significantly greater than that of the sludge which might be obtained from the settling tank.

However, according to the present invention, the selective removal of that portion of the sludge blanket only having the desired high solids concentration must be done without disturbing the sludge blanket and is accomplished by the drum 46 of steel construction and rotatably supported by the carriage 47. Carriage 47 is provided with wheels 48 to operate on the track rails 49 extending along each side of the tank. The reversible motor 51, shown diagrammatically, is connected to the wheels at one end of carriage 48 to rotate the wheels and move the carriage lengthwise of the tank at predetermined intervals. The motor 52 also mounted on carriage 47, is connected to drum 46 by the chain drive 53 shown diagrammatically to rotate the drum as the carriage moves from one end of the tank to the other.

The surface of drum 47 may be of ordinary structural steel and should be reasonably cylindrical so that the doctor blade or scraper 54 mounted on carriage 47 is effective to remove the sludge which adheres to the drum. The trough 55 extending below the lower edge of blade 54 has a sloping bottom and a lower discharge end projecting over the side of tank 11 and provided with the spout 56. The stationary trough 57 extends the full traverse of spout 56 to receive the sludge and has a central discharge opening to which the pipe 58 is connected for withdrawing the sludge for treatment which will allow its disposal.

The operation of a typical unit described hereinafter was conducted in connection with a primary treatment tank from which the settled sludge was withdrawn at the rate of twenty-five gallons per minute. This sludge had a solids content of approximately 9.91 percent so that the loading rate per square foot of surface area of the thickening unit was fifteen lbs. per day of dry solids. The recycle flow of clear water taken from the effluent of the thickening unit at the rate of eighty gallons per minute was delivered to the tank at forty lbs. per square inch gauge pressure and fifty cubic feet of air per hour was injected into the line at forty-four lbs. per square inch gauge pressure. The water level was established first by passing clear water through the tank so that the lowermost portion of the drum had an elevation of one inch above the water level referred to.

The initial period of operation extended about one hour during which time the drum and carriage remained inoperative in order to allow the development of the sludge blanket at the water level. The sludge blanket developed after two hours of initial operation extended nine inches below the water level and about two and one-half inches above the water level. The drum was then rotated at a speed so that it had a peripheral speed of approximately forty-five feet per minute and the carriage was set ot traverse the tank at a speed of one-half foot per minute. The distance travelled by the carriage was about ten feet so that each pass was made by the carriage in about twenty minutes time. The carriage and drum were operated intermittently with an elapsed time of about ten minutes between each pass of the drum across the tank. Over a forty-eight hour period, the sludge picked up by the drum had an average solids concentration of 5.5 percent solids. The detention time of the solids in the tank was about two and one-half hours.

The operation of the unit required no particular attention after initial operation was established. The variations in the thickening process did not adversely effect the solids concentration for the reason that the elevation of the drum above the normal water level of the tank required a supporting sludge blanket of a minimum depth to be established before the drum withdrew any sludge from the top of the blanket. By reason of the fact that the solids concentration of the air-solids blanket corresponds generally with the viscosity of the blanket, the amount of air-solids or sludge withdrawn with each pass of the carriage over the tank varied considerably. This variation was due to two factors, namely the elevation of the solids and the viscosity of the air-solids blanket itself.

That is, the effect of the air flotation of the solids is not only such that the sludge blanket has a greater concentration of solids at the higher elevations, but also according to the invention, the air-solids blanket has a solids concentration which varies directly with its viscosity. Accordingly, as the drum moves through and engages the blanket, the drum selectively removes the solids above a given height at different rates according to the viscosity of the material encountered by the drum at different places along the drum itself and at different times as the carriage makes a single pass across the tank and from time to time throughout any given period of operation of the carriage. Accordingly, while the sludge blanket may have a solids concentration in the order of two or three percent, the concentration of the sludge withdrawn by the drum may be in the order of five to seven percent by reason of such selective removal of the air-solids only having such greater concentration. Although these figures show only a few percent increase of concentration, they represent a 100 percent improvement in the concentration achieved by the invention.

The invention is distinguished by the air-flotation which provides an air-solids blanket of varying density and viscosity and wherein the solids concentration is in direct proportion to both, and by the drum which is thereby made capable of "picking and choosing" to provide a solids concentration appreciably better than the average developed in the tank and removed by conventional means.

Various modes of carrying out the invention are contemplated as within the scope of the following claims particularly pointing out and distinctly claiming subject matter which is regarded as the invention.

I claim:

1. The method of thickening a suspension of solids carried in a liquid, which method comprises introducing the suspension into a tank with finely divided air bubbles and retaining the suspension in the tank until a floating blanket is formed having a substantial depth and an upper layer disposed above the liquid level and until the solids concentration of said upper layer reaches the range where the corresponding viscosity varies substantially so that the thicker parts of said upper layer having a higher solids concentration have a considerably higher viscosity and the thinner parts of said upper layer having a relatively lower solids concentration have a considerably lower viscosity, thereafter moving and rotating a roll having a smooth surface to place said surface in and out of contact with successive portions of the upper surface of said upper layer to withdraw the thicker parts thereof in greater quantity and at a faster rate relative to the quantity and rate of withdrawal by the roll of the thinner parts of said upper layer by reason of said differences in viscosity, and collecting the material removed by the roll which material will thereby have a concentration substantially greater than the general average concentration of said upper layer.

2. The method of thickening a suspension of solids carried in a liquid, which method comprises passing the suspension through the lower part of a tank with finely divided air bubbles to form and continuously maintain a floating blanket in the upper part of the tank and having an upper layer disposed above the liquid level but with a solids concentration of a variation in the range where the viscosity varies correspondingly so that the thicker parts of said upper layer having a higher solids concentration have a considerably higher viscosity and the thinner parts of said upper layer having a relatively lower solids concentration have a considerably lower viscosity, the improvement comprising moving and rotating a roll having a smooth surface to place said surface in and out of contact only with successive portions of the upper surface only of said upper layer to withdraw the thicker parts thereof in greater quantity and at a faster rate relative to the quantity and rate of withdrawal by the roll of the thinner parts of said upper layer by reason of said differences in viscosity, and collecting the material removed by the roll which material will thereby have a concentration substantially greater than the general average concentration of said upper layer.

References Cited in the file of this patent

UNITED STATES PATENTS

| | | |
|---|---|---|
| 1,860,819 | Schamberger | May 31, 1932 |
| 2,334,703 | Henkel | Nov. 23, 1943 |
| 2,920,763 | Lind et al. | Jan. 12, 1960 |
| 3,004,672 | Conley et al. | Oct. 17, 1961 |